(12) United States Patent
Ciochina

(10) Patent No.: US 12,218,867 B2
(45) Date of Patent: Feb. 4, 2025

(54) METHOD IMPLEMENTED BY DEVICE TO TRANSMIT REFERENCE SIGNAL, COMPUTER PROGRAM PRODUCT, AND DEVICE

(71) Applicant: MITSUBISHI ELECTRIC CORPORATION, Tokyo (JP)

(72) Inventor: Cristina Ciochina, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 628 days.

(21) Appl. No.: 17/273,520

(22) PCT Filed: Oct. 1, 2019

(86) PCT No.: PCT/JP2019/039418
§ 371 (c)(1),
(2) Date: Mar. 4, 2021

(87) PCT Pub. No.: WO2020/090350
PCT Pub. Date: May 7, 2020

(65) Prior Publication Data
US 2021/0218530 A1    Jul. 15, 2021

(30) Foreign Application Priority Data
Oct. 31, 2018   (EP) .................................. 18306438

(51) Int. Cl.
*H04L 5/00*   (2006.01)
*H04W 92/18*   (2009.01)
(52) U.S. Cl.
CPC ........... *H04L 5/0048* (2013.01); *H04W 92/18* (2013.01)

(58) Field of Classification Search
CPC ..... H04L 5/0048; H04L 5/006; H04L 5/0064; H04L 5/0069; H04L 5/0076; H04W 92/18
See application file for complete search history.

(56) References Cited

U.S. PATENT DOCUMENTS

| 2003/0060165 A1* | 3/2003 | Horisaki | H04L 25/0226 455/67.14 |
| 2015/0180631 A1* | 6/2015 | Zhang | H04L 5/0048 370/329 |

(Continued)

FOREIGN PATENT DOCUMENTS

| EP | 2 887 730 A1 | 6/2015 |
| KR | 10-2017-0112945 A | 10/2017 |

(Continued)

OTHER PUBLICATIONS

Extended European Search Report for European Application No. 21212993.6, dated Apr. 4, 2022.

(Continued)

*Primary Examiner* — Hashim S Bhatti
(74) *Attorney, Agent, or Firm* — Birch, Stewart, Kolasch & Birch, LLP

(57) ABSTRACT

The invention relates to a method implemented by a device to transmit reference signal, RS, in a device-to-device, D2D, communication in a wireless communication system, the method comprising:—selecting an RS pattern among a set of at least two RS patterns, according to communication conditions:—emitting a radio signal for D2D communication according to the selected RS pattern.

17 Claims, 5 Drawing Sheets

(56) References Cited

U.S. PATENT DOCUMENTS

| | | | |
|---|---|---|---|
| 2015/0288483 A1* | 10/2015 | Sun | H04L 5/0048 |
| | | | 370/329 |
| 2016/0295624 A1 | 10/2016 | Novlan et al. | |
| 2017/0048905 A1* | 2/2017 | Yun | H04W 76/14 |
| 2017/0187503 A1 | 6/2017 | Seo et al. | |
| 2017/0273128 A1 | 9/2017 | Abedini et al. | |
| 2018/0212733 A1* | 7/2018 | Khoryaev | H04L 5/0007 |
| 2018/0220448 A1* | 8/2018 | Akkarakaran | H04L 5/0023 |
| 2018/0241508 A1 | 8/2018 | Chervyakov et al. | |
| 2019/0090218 A1 | 3/2019 | Noh et al. | |
| 2019/0268184 A1* | 8/2019 | Seo | H04W 72/02 |
| 2019/0379481 A1* | 12/2019 | Zhang | H04L 27/3488 |
| 2020/0336276 A1* | 10/2020 | Tang | H04L 5/0007 |
| 2021/0105113 A1* | 4/2021 | Saito | H04L 5/0051 |

FOREIGN PATENT DOCUMENTS

| | | |
|---|---|---|
| WO | WO 2018/132237 A2 | 7/2018 |
| WO | WO 2018/171742 A1 | 9/2018 |

OTHER PUBLICATIONS

Office Action issued in Japanese Patent Application No. 2021-536599 on May 24, 2022 with an English Translation.

\* cited by examiner

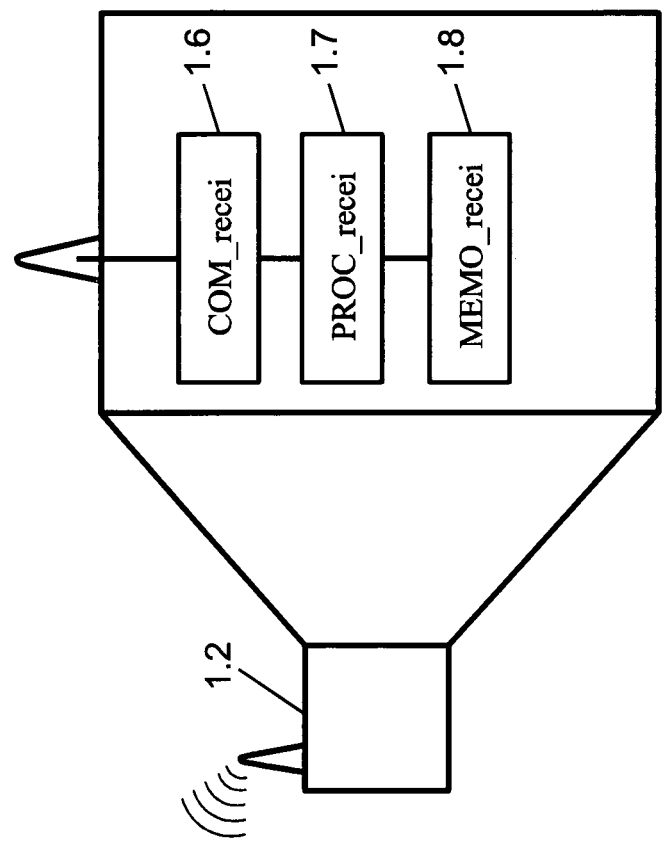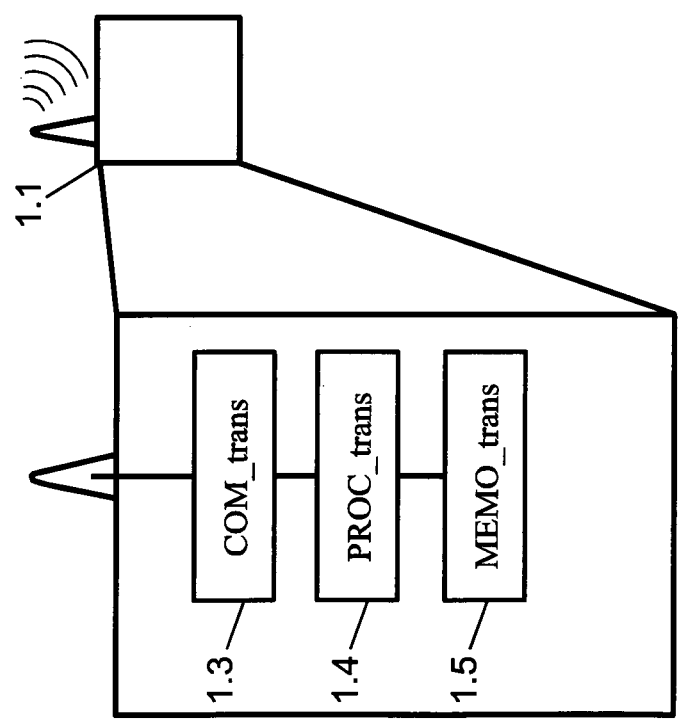
FIG. 1

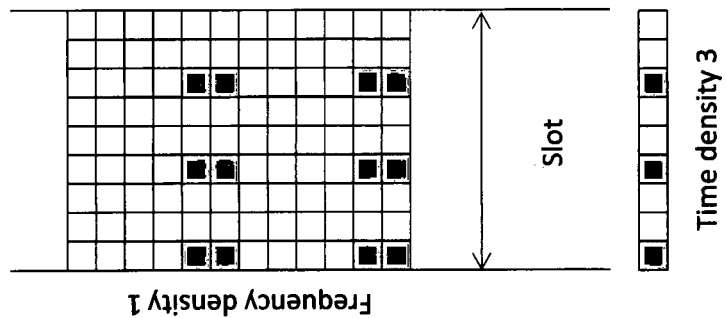
FIG. 3.3
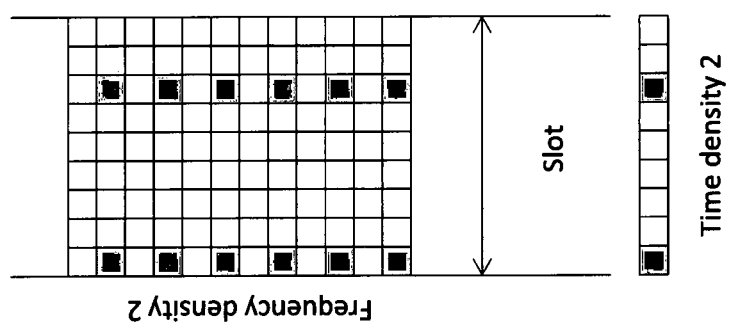
FIG. 3.2
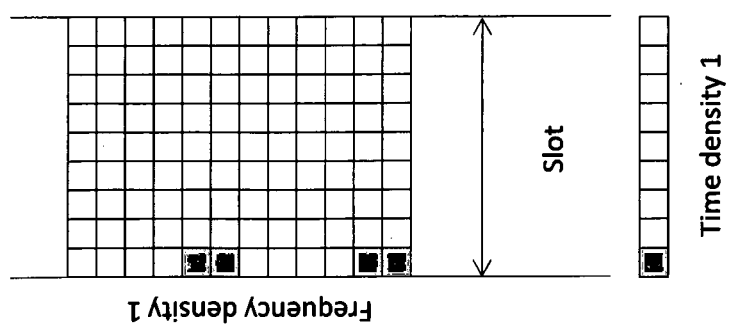
FIG. 3.1

FIG. 4.3
FIG. 4.2
FIG. 4.1

METHOD IMPLEMENTED BY DEVICE TO TRANSMIT REFERENCE SIGNAL, COMPUTER PROGRAM PRODUCT, AND DEVICE

TECHNICAL FIELD

The present invention relates to device to device communications in wireless communication system.

BACKGROUND ART

It relates more precisely to the implementation of reference signals (RS) in device to device communications.

SUMMARY OF INVENTION

In device to device communications the LTE standard states that the transmitting device inserts RS according to a unique predefined RS pattern. This predefine RS pattern has a high temporal density.

In wireless communications, whenever communication is established between the radio base station and the mobile terminal, the radio base station determines the best suited RS patterns based on its knowledge of the uplink/downlink channel state information and/or on interference profiles and configures the mobile terminal to receive or to transmit the RS pattern it determined as best suited. In device to device communication, in some scenarios, the radio base station is unable of determining the best suited RS pattern to be implemented by the mobile device for sidelink communication (that is, with another device). Indeed, for example, the two communicating devices may be out of the coverage of a radio base station. In another example, the radio base station has not enough information on the conditions of the device to device communication to determine the best suited RS pattern. Therefore, the RS pattern implemented in device to device (D2D) communication in LTE (especially in V2X system) is always the same, and it was dimensioned to cope with the worst case scenario. Indeed, this enables the receivers, in a D2D communication, to retrieve the data transmitted by the transmitter even when the communication canal is bad (for example when the receiver and/or transmitter are travelling at very high speeds).

Therefore, the RS pattern specified in LTE for D2D communication enables to have a correct channel estimation and to properly decode the radio signal in the worst case scenario, for example, when the radio channel varies a lot.

However, when the radio channel is no so bad, for example, when variations of radio channel are at the most moderate, the RS pattern implemented in LTE for D2D communication involves sending an unnecessary high amount of RS, leading to a loss of efficiency in the use of the radio resources.

In addition, in the recent millimeter-Wave systems, which is the case of the new radio (NR) standard or 5G currently at normalization, operations performed at high carrier frequency level are subject to strong and fast variations of the radio channel due to different causes such as phase noise, carrier frequency offset, Doppler effects, etc. This makes the tracking of the channel state difficult, since a strong variation can occur between two successive transmissions of RS. The worst case scenarios, in the new system may require even higher temporal density RS pattern than in the LTE standard. Thus, implementing such RS pattern in D2D communications involves wasting an important amount of radio resources.

The present invention aims at improving the situation.

To that end, the invention relates to a method implemented by a device to transmit reference signal, RS, in a device-to-device, D2D, communication in a wireless communication system, the method comprising:
 selecting by the device an RS pattern among a set of at least two RS patterns, according to communication conditions;
 emitting a radio signal for D2D communication which transmit RS set according to the selected RS pattern.

The invention enables the transmitting device in a D2D communication, that is, the device which transmits data directly to other devices, to adapt the amount of RS and their positions in time and in frequency in the radio signal according to the conditions of the D2D communication. The communication conditions may be determined by the device, for example, by determining the relative speed with another device with which it is involved in a D2D communication. The device, to determine the communication conditions, may use information transmitted by the other devices (for example, via a feedback on a sidelink control channel, and/or a synchronization sequence, and/or reference signals, etc) with which it is or will be involved in a D2D communication or even transmitted by a radio base station when the device is in the cover of that base station. Based on those communication conditions, the transmitting device (the device emitting the radio signal) selects a RS pattern.

The RS pattern that will be implemented by the transmitting device will be selected to optimize the amount of RS and their positions (in frequency and/or in time) according to communication conditions which are for example the quality of the radio channel and the communication parameters of the devices (transmitting scheme, subcarrier spacing, etc.) involved in the D2D communication. The base station may not be aware of the RS pattern selected by the transmitting device.

Therefore, it enables to have a correct channel estimation and to properly decode the radio signal at the receiver side without wasting radio resources to transmit an unnecessary amount of RS.

In addition, the device may select a RS pattern adapted to the communication parameters of the devices, for example, RS pattern may be selected according to the waveform used to produce the radio signal, for example DFTsOFDM or OFDM. Using a RS pattern adapted to the communication parameters also enables to enhance the decoding of the radio signal at the receiver side. For example, if data and RS are to be mixed in the same symbol, for DFTsOFDM (also known as SC-FDMA) it is preferable to insert the RS together with the data in the pre-DFT domain, and not in the frequency domain as for CP-OFDM, in order to preserve the low peak to average power ratio of the signal. Hence, the patterns used for different waveforms are different. Moreover, if frequency domain RS insertion needs to be performed for DFTsOFDM in order, for example, to use the same frequency domain patterns as CP-OFDM and reduce the specification effort, then data/RS multiplexing within the same symbol is either prohibited, or must follow specific repetition and/or phase shifting rules in order to ensure a good peak to average power ratio. In this case, in order to control the total RS overhead, the constraints on time domain density patterns for DFTsOFDM may be different than for CP-OFDM. Hence, the patterns used for different waveforms are different.

By reference signals the invention encompasses all symbols that are known by the receiver regarding their values and their positions, and on the basis of which the receiver can estimate the impact of the channel between the transmitter and the receiver and the transformations made by the transmitting device resulting in the radio signal (in case of non-transparent transmission scheme). For example, based on the received version of the reference signals (e.g. corrupted by channel and/or noise and/or phase noise, etc), the receiver can estimate the channel and/or improve the channel estimation quality. Note that the channel encompasses here all effects including propagation and hardware impact such as nonlinearities, phase noise, Doppler, carrier frequency offset etc.

In the case of NR, these RS may be for example, PTRS, DMRS, SRS, CSI-RS, or RS used for different purposes such as positioning, discovery, etc.

By RS pattern it is understood a pattern which specifies the positions of the RS. These positions may be defined in several ways.

The RS pattern may specify the positions in time (also referred as temporal position) and in frequency which are occupied by RS.

For example, in LTE V2X, for each sidelink channel one single RS pattern specifies the possible positions and number of DMRS to be inserted by the mobile transmitter in a sidelink transmission in the context of cellular V2X communication. For example, for LTE sidelink shared channel the DMRS are positioned in time positions 2 and 5 for the first slot in the subframe (that is, in $3^{rd}$ and $6^{th}$ symbol) and 1 and 4 for the second slot in the subframe (that is, in $2^{nd}$ and $5^{th}$ symbol of the second slot) which always contains 14 symbols. In the designated symbols, all subcarriers are occupied by RS. In another example, for a SC-QAM or for a SC-FDE scheme or for other transmission schemes based on processing blocks of symbols, each block of symbols being transformed in SC-QAM/SC-FDE symbol by the SC-QAM/SC-FDE modulator, the RS pattern may specify the temporal position (i.e. the position of the SC-QAM/SC-FDE symbols carrying RS among a suite of SC-QAM/SC-FDE symbols) and the positions which are occupied by RS within each block of symbols containing RS at the input of the SC-QAM/SC-FDE modulator. For example, when dedicated RS symbols are employed (no RS/data mix within one symbol), the RS pattern may only specify the temporal position.

The RS pattern may specify the temporal position and the pre-DFT positions which are occupied by RS. For example, when the transmitting device implements a DFTsOFDM scheme with pre-DFT RS insertion, the RS pattern may specify the DFTsOFDM symbols containing RS and the positions occupied by RS at the input of the DFT for those DFTsOFDM symbols containing RS.

By positions in time and/or in frequency it is understood a resource unit, possibly the smallest resource unit, located in these time and/or frequency positions. By frequency position it is often understood the subcarrier used to carry this RS (or resource unit) allocation resource. By temporal position it is often understood as the symbol in which this RS. By pre-DFT position it is understood the position of the RS in the block of symbols present at the input of a DFT for a DFTsOFDM modulator as described in FIG. 2.

By device to device communication it is understood a direct communication between at least two devices without traversing a radio base station.

By communication conditions it is understood conditions related to the radio channels between the devices involved in the D2D communication and/or the parameters of this D2D communication (communication parameters).

The set of RS patterns comprises several different RS patterns. These RS patterns enable to cover different situations, that is, different situations according to the communication conditions. Therefore, at least one RS pattern in the set of RS patterns corresponds to a first situation of communication conditions and another RS pattern in the set of RS pattern corresponds to a second situation of communication conditions.

By emitting a radio signal according to the selected RS pattern it is understood emitting a radio signal which transmit RS set according to the selected RS pattern. That is, inserting RS according to the positions defined by the selected RS pattern. That is, for example, carrying each RS on a specific subcarrier in a specific symbol, or in a specific pre-DFT position in a specific symbol. When frequency positions are defined in the RS pattern, each symbol may convey one or several RS, that is, on one or several subcarriers. A succession of symbols is outputted by the transmitting device, wherein each symbol of the succession of symbols may or not contain one or several RS according to the RS pattern. This succession of symbols is then transmitted through the radio signal.

The symbols in which are inserted the RS are the symbols which are transmitted through the radio signal. For example, an OFDM symbol or a DFTsOFDM (a DFT spread OFDM) symbol.

According to an aspect of the invention, the device transmits information relative to the selected RS pattern.

This enables the devices receiving the radio signal in the D2D communication to be informed of the RS pattern according to which the RS have been inserted in the radio signal emitted by the transmitting device. Therefore, the receiving devices need less computing to determine the position of the RS in the radio signal, and thus less computing to process the RS and deduce the effect of the radio channel on the radio signal and/or the transmitting scheme used by the transmitting device (when it is a non-transparent transmitting scheme).

By information relative to the selected RS pattern it is understood any information which enables the receiving devices to determine the RS pattern.

This information may be explicit information. For example, a value from an index mapped to the set of RS patterns. This information may be set in a field in a sidelink control channel, that is, a control channel dedicated for D2D communications. In another example, each RS pattern may be represented by the indices of symbols which include RS or the number of symbols which include RS. Therefore, a field in a sidelink control channel can inform of these numbers. If for at least one of these numbers several RS patterns are available in the set of RS patterns, then a second information can be transmitted in the sidelink control channel, for example, representative of the level of density of RS in the frequency domain, that is, an indication of the number (or the average number) of subcarriers carrying a RS in each symbol comprising RS, for example, a value for low frequency density, one for medium density and one for high density.

In another example, the RS patterns may be represented by their number of RS, in case several RS patterns in the set of RS patterns have the same number of RS a second information can be transmitted with the number of RS in the sidelink control channel to distinguish them.

This information may be implicit information, which enables the receiving devices to determine the RS pattern used, without being explicitly identified by information transmitted by the transmitting device. For example, the receiving device is able to determine the RS pattern to be used based on a common set of rules known by both the receiving device and the transmitting device and/or based on information related to other purposes. For example, information related to other purposes may be an indication on slot configuration, and/or an indication of the configuration of other types of RS, and/or an indication relative to a parameter of communication, or any other information not explicitly indicating a specific RS pattern. In another example, the number and/or the exact positions of the RS in the frequency domain (or in the pre-DFT domain) depend on communication conditions.

The RS pattern may be identified by an information jointly representing the time and frequency (or pre-DFT) positions of the RS; thus, every possible pattern is uniquely identified. The RS pattern may be identified by separate information on the time positions of the RS and on the frequency (or pre-DFT) positions of the RS; thus, part of this information may be implicitly deduced and does not need to be signaled, reducing the signaling overhead.

According to an aspect of the invention, at least one RS pattern among the set of RS patterns corresponds to a pattern where a number X of symbols comprise RS and one RS pattern among the set of RS patterns corresponds to a pattern where a number Y of symbols comprise RS, said number Y being different than the number X, the symbols of each pattern being symbols outputted by the transmission scheme used by the device to transmit the radio signal.

Therefore, at least two RS patterns of the set of RS patterns have a different number of symbols containing RS. This enables the transmitting device to select among the set of RS patterns, a RS pattern with higher number of RS symbols more suitable when the variations of the radio channel are important and a RS pattern with a smaller number of RS symbols more suitable when the variations of the radio channel are moderate or low and with a better use of the radio resources.

The number X and Y are set between 1 and the maximum number of symbols in a time unit of a partition scheme, said partition scheme dividing the radio signal into time units (that is groups of symbols). Whenever not stated otherwise, the time unit is understood as being defined by a number of symbols in the group of symbols.

According to an aspect of the invention, the selection of the RS pattern is made according to at least one of the communication conditions, said at least one of the communication conditions being a number of symbols in a time unit of a partition scheme, said partition scheme dividing the radio signal into time units.

Therefore, the selection of the RS pattern is made at least according to the number of symbols in a time unit of a partition scheme.

By time unit of a partition scheme (or time partition scheme) it is understood a time division of the signal in time units. That is, the radio signal may be divided in several time units, each of the time units being divided in several symbols. Advantageously each RS pattern of the set of RS patterns is fully defined on a time unit. That is, when inserting RS according to an RS pattern the positions of the RS are identical from one time unit to another.

The number of RS symbols may be seen as a number of RS symbols for a given time unit.

In the LTE and NR standards the time units are either the subframe or respectively the slot or mini-slot. In LTE, the slot contains 6 or 7 symbols and the subframe contains two slots, that is, 12 or 14 symbols. In NR, number of symbols in a slot may range from 2 to 14 symbols.

When the number of symbols in a time unit increases it is necessary to have more symbols containing RS, for example, to achieve a comparable channel estimation quality. Therefore, a RS pattern with a larger number of symbols containing RS in the time unit may be selected.

When the number of symbols in the time unit decreases it is possible to have fewer symbols containing RS, for example, to achieve a comparable channel estimation quality and to reduce the number of symbols containing RS to avoid using more resource for transmitting RS. Therefore, a RS pattern with a lower number of symbols in the time unit containing RS may be selected.

For example, in NR when a small slot is used for the D2D communication, for example, a slot containing 4 symbols it is advantageous to use a pattern with a lower number of RS than when a large slot is used, for example, a slot containing 14 symbols.

According to an aspect of the invention, the selection of the RS pattern is made according to at least one of the communication conditions, said at least one of the communication conditions being a time domain duration of a symbol used for the D2D communication.

Therefore, the selection of the RS pattern is made at least according to the time domain duration of a symbol used for the D2D communication.

Time domain durations in multi-carrier communications may depend on the subcarrier spacing configuration. That is, the frequency spacing between two adjacent subcarriers. Symbols with smaller subcarrier spacing configuration may have longer time duration than symbols with bigger subcarrier spacing configuration.

The new standards like NR offer the possibility to use different subcarrier spacing configuration in the same carrier. Therefore, the device may have the possibility to use those different types of subcarriers. More generally, the device may have the possibility to transmit data with symbols having different time domain duration.

Therefore, depending on the time domain duration (or the subcarrier spacing configuration) of the symbols used by the device, a different RS pattern may be implemented. For example, for a given time unit, when using symbols with a longer time duration it is advantageous (for example, to achieve a comparable channel estimation quality) to select a RS pattern with a higher number of symbols containing RS than when using symbols with a smaller time duration. Indeed, when the time duration of the symbols is shortened the time between two symbols carrying RS is also shortened, therefore, a RS pattern with fewer symbols carrying RS may be selected.

According to an aspect of the invention, the selection of the RS pattern is made according to at least one of the communication conditions, said at least one of the communication conditions being a set of resources comprising the resource used by the device for transmitting of the radio signal.

Therefore, the selection of the RS pattern is made at least according to the set of resources comprising the resource used by the device for transmitting of the radio signal.

By set of resources it is understood for example a resource pool and/or a bandwidth part. That is, a set of radio resources (resource units) which may possibly be used by the device. To limit interferences with the cellular communications at least one resource pool with its own resources may be configured for D2D communications. Also, to address the issue of devices supporting narrower radio frequency bands than the radio frequency bands used by a radio base station, bandwidth parts where the device is expected to transmit and/or receive may be configured. Each of these resource pools or bandwidth parts may be used with specific RS patterns adapted to the specificity of the resource pool and/or bandwidth part.

For example, different resource pools and/or bandwidth parts may be used for different types of services with different requirements. Thus the RS pattern is adapted to the requirements corresponding to a given resource pool/bandwidth part.

For example, depending on the interference profile and/or on the types of services the network plans on scheduling in same or adjacent bands, the set of RS patterns among which the device is able of choosing may be constrained by the network. Thus, global network performance is not impacted by the choices made by the devices during device to device communication.

Therefore, these specific RS patterns may be included in the set of RS patterns, and the transmitting device may select one of the RS pattern corresponding to the set of resources through which the device transmits data.

According to an aspect of the invention, the selection of the RS pattern is made according to at least one of the communication conditions, said at least one of the communication conditions being a relative speed between the device and a receiving device or the device and a group of receiving devices.

Therefore, the selection of the RS pattern is made at least according to the relative speed between the device and a receiving device or the device and a group of receiving devices.

In D2D communications the relative speed between the transmitting device and the receiving device impacts the radio channel. More specifically, the greater the relative speed is the more important the variations of radio channel are. Therefore, a RS pattern with a higher number of RS symbols is better suited for a transmission between two devices when these devices experiment an important relative speed between each other. Indeed, inserting RS according to a RS pattern with a high number of RS symbols enables to finer track the variation of the radio channel and avoids to have a bad estimation of the radio channel used to transmit the symbols which do not comprise RS. On the contrary, a RS pattern with a lower temporal density enables to reduce the use of the radio resources when the two devices experiment a low relative speed between each other. Thus, using an RS pattern adapted to the relative speed between the transmitting device and the receiving device enables to enhance the estimation of the channel to properly decode the radio signal while reducing the use of radio resources.

The device may determine the relative speed experimented with the receiving device based on:
  measurements of the strength and/or of the signal strength variations of a signal received from the receiving device;
  measurements of the Doppler shift and/or of the Doppler spread of a signal received from the receiving device;
  indication received from the receiving device of the Doppler shift and/or of the Doppler spread and/or of the signal strength performed by the receiving device;
  Knowledge on the relative speed acquired from other measurement systems collocated with the transmitter or receiver device.

When the transmitting device is involved in a D2D communicates with a group of receiving devices, it may use an average relative speed with respect to all or with respect to part of the devices in the group of devices, or an average relative speed obtained with relative speeds weighted according to the signals strength of all or part of group of receiving devices (that is a subset of devices among the group of receiving devices).

The relative speed may be a class or a range of relative speeds. For example, a rough determination of a range for the relative speed (e.g. pedestrian/vehicular/high speed, or low/medium/high speed, etc) is performed.

According to an aspect of the invention, the selection of the RS pattern is made according to at least one of the communication conditions, said at least one of the communication conditions being a type of routing scheme.

Therefore, the selection of the RS pattern is made at least according to the type of routing scheme used in the D2D communication.

By type of routing scheme it is understood the range of other devices to which the device transmits the data. The routing schemes are for example, unicast, broadcast and multicast.

In unicast and multicast D2D communications are generally two-way communications enabling feedbacks, whereas, broadcast communication is generally a one-way communication with little information available concerning the receiving devices. Therefore, in unicast and multicast communications the device may obtain more accurate information on the radio channel, for example through feedback or by analyzing previous received radio signals sent from the receiving devices enabling to determine for example, the relative speed between the device and the receiving devices. The device may select the RS pattern according to the communication conditions related to the receiving devices. For example, the device selects the RS pattern based on a rule enabling to optimize the performance of the communication, for example, considering the median of the relative speeds, the medium of the relative speeds or a weighted sum of the relative speeds. When the number of receiving devices is reasonable, for example under a predefined threshold, the device may select the RS pattern by taking into account the relative speeds between it and each other receiving device. If the number of receiving devices requires too much processing for the transmitting device, for example, a number of receiving devices above a threshold, the device may select the RS pattern by taking into account the relative speeds of only a subset of receiving devices among the group of receiving devices.

In the case of broadcast, since the device may not have previously received radio signals sent from the receiving devices, the device may select a RS pattern with the greatest number of RS (or the greatest number of symbols comprising RS) of the set of RS patterns.

According to an aspect of the invention, the selection of the RS pattern is made according to at least one of the communication conditions, said at least one of the communication conditions being a type of modulation and coding scheme.

Therefore, the selection of the RS pattern is made at least according to the type of modulation and coding scheme used in the D2D communication.

By selecting the RS pattern for the D2D communication according to the type of modulation and coding scheme (MCS) it enables to enhance the estimation of the channel to properly decode the radio signal while reducing the use of radio resources. Indeed, the robustness of the radio signal and therefore the ease to decode it, directly depends on the modulation and coding scheme used for the communication. A modulation scheme with a small amount of symbols and a low coding rate (low order MCS) reduces the sensibility of the radio signal to the radio channel and therefore reduces the possibility of an erroneous decoding. Therefore, a RS pattern with a lower number of symbols comprising RS and a low density in the frequency domain (that is a low frequency density) may be suitable to properly decode the radio signal while using a reduced amount of radio resources for the RS.

In contrary, a modulation scheme with an important amount of symbols and a high coding rate (high order MCS) increases the sensibility of the radio signal to the radio channel and therefore increases the possibility of an erroneous decoding. Therefore, a RS pattern with a higher number of symbols comprising RS and a higher density in the frequency domain may be suitable to properly decode the radio signal.

According to an aspect of the invention, the selection of the RS pattern is made according to at least one of the communication conditions, said at least one of the communication conditions being a type of transmission scheme.

Therefore, the selection of the RS pattern is made at least according to the type of transmission scheme.

By transmission scheme it is understood the scheme applied to obtain the emitted radio signal, on the data to be transmitted by the device. That is, the transmission scheme corresponds to the different modules that are successively applied to obtain the radio signal.

Selecting a RS pattern according to the transmission scheme enables to enhance the estimation of the channel to properly decode the radio signal.

Indeed, different transmission schemes require different RS patterns. For example, transmit diversity schemes such as time domain precoder vector switching require at least 1 RS to be present in each sub-group of symbols in the time unit precoded with the same precoder. In another example, for multi-layer transmission or for non-transparent transmission schemes, several orthogonal antenna ports are used and the transmitting device needs to select appropriate sequence with corresponding cyclic shifts in order for the receiving devices to discriminate which cyclic shift is used by which layer (for example the cyclic shifts are chosen in ascending order of the antenna port numbering and the exact reference signal to ne used depends on an identifier of the mobile device).

In addition, the radio signal issued from the transmission scheme has a certain waveform which depends on the scheme implemented. For example, a transmission scheme implementing a DFTsOFDM scheme issues a single carrier waveform. It is advantageous to maintain the properties of the waveform, for example the single carrier property. To do so it may be necessary to select specific RS patterns, that is, RS patterns which enable to maintain or at least reduce the impact of the insertion of RS on the properties of the waveform. For example, the single carrier property in a DFTsOFDM scheme may be maintained by inserting the RS before applying the DFT module of the DFTsOFDM scheme (also known as SC-FDMA). Therefore, the position of the resulting RS in the time domain and in the frequency domain may be constrained by this requirement. Therefore, only specific RS patterns may be suited for each waveform.

Therefore, selecting a RS pattern according to the waveform, enables to maintain the properties of the waveform issued from the transmission scheme that the device implements. Moreover, the device may implement several waveforms/transmission schemes.

According to an aspect of the invention, the selection of the RS pattern is made according to at least one of the communication conditions, said at least one of the communication conditions being a resource allocation.

Therefore, the selection of the RS pattern is made at least according to the resource allocation.

By resource allocation it is understood the radio resources allocated to the device and effectively used for transmitting in D2D communication with the other devices.

The device transmits data through resource units that have been allocated to it. Each allocation may differ in size and in shape (how the allocated resource units are spread in the frequency domain and in time the time domain). According to the size and shape of the resource allocation, some RS patterns may be better suited. For example, a short duration allocation, for example a lower number of symbols than in the time unit, or/and a narrow allocation in the frequency domain, a pattern which maintains a desired density of RS (in time domain and/or in frequency domain) may be chosen. Therefore, adapting the insertion of RS according to the allocation of resources used by the device in a D2D communication enables to maintain the relevant density of RS and thus to enhance the estimation of the channel to properly decode the radio signal while reducing the use of radio resources.

According to an aspect of the invention, the selection of the RS pattern is made according to at least one of the communication conditions, said at least one of the communication conditions being an identifier of the transmitting device and/or an identifier of the receiving device and/or an identifier of the group of receiving devices. Therefore, interference among RS corresponding to different transmissions may be randomized and thus the system performance is improved. Thus, if the transmitting device and the receiving device and/or group of receiving devices have knowledge of said identifiers, there is no need of transferring a second information and signaling overhead is reduced.

According to an aspect of the invention, the selection of the RS pattern comprises:

obtaining a value corresponding to the communication conditions;

comparing the value with a set of thresholds $Th_0, \ldots, Th_n$, such as $Th_i \leq Th_{i+1}$ and such as each interval $[Th_i; Th_{i+1}[$ or $]Th_i; Th_{i+1}]$ corresponds to a subset of the set of at least two RS patterns;

selecting a RS pattern among the subset corresponding to the interval in which the value is.

By value corresponding to the communication conditions it is understood a value obtained based at least on one of the communication condition determined by the device, more advantageously based on several or all the communication conditions determined by the device. For example, to each communication condition can be associated a condition value (for example a level) and the value may be obtained as a weighted sum of these condition values.

This enables to efficiently configure the device by sending to the device only a set of thresholds. Indeed, only the set of thresholds is transmitted, thus each segment $[Th_i; Th_{i+1}]$, whatever values are taken by the thresholds provided that $Th_i \leq Th_{i+1}$, corresponds to a i-th subset of RS patterns previously defined. Therefore, the configuration can be easily adapted by only modifying the thresholds, for example, by setting $Th_i = Th_{i+1}$ to disable the i-th subset of RS patterns.

The configuration of the device may be done by the network via a radio base station when the device is in the covert of this base station.

A default configuration may be provided. That is, specific thresholds may be defined and known by all the devices. When the transmitting device uses different thresholds than in the default configuration, information relative on these different thresholds is transferred to the receiving devices. The configuration of the device may be dependent on the geographical area where the device is located; thus, all devices in a given geographical area have common understanding about the thresholds.

According to an aspect of the invention, the selection of the RS pattern is made according to at least one of the communication conditions, said at least one of the communication conditions being a type of information transmitted.

For example, different type of information such as basic data, control data, safety-related information may have different requirements in terms of reliability. For data with high reliability requirements, RS patterns with more RS are needed in order to ensure good quality of the communication.

According to an aspect of the invention, the selection of the RS pattern is made according to at least one of the communication conditions, said at least one of the communication conditions being a carrier frequency. Indeed, the channel profile is different at different carrier frequencies, significant differences existing in terms of frequency selectivity, phase noise profile, beamforming gain, Doppler profile. Thus, the selection of the RS pattern can be made depending on the carrier frequency. For example, RS patterns with more symbols comprising RS are needed at higher carrier frequencies. Thus, the phase effects of the channel can be better compensated. For example, RS patterns with more RS in the frequency domain are needed at lower carrier frequencies. Thus, more frequency selective channels can be better compensated.

A second aspect of the invention concerns a computer program product comprising code instructions to perform the method as described previously when said instructions are run by a processor.

A third aspect of the invention concerns a device for transmitting reference signals, RS, in a device-to-device, D2D, communication in a wireless communication system, the device comprises:
 a processor; and
 a non-transitory computer-readable medium comprising instructions stored thereon, which when executed by the processor configure the device to:
  select an RS pattern among a set of at least two RS patterns, according to communication conditions;
  transmitting a radio signal for D2D communication according to the determined RS pattern.

The present invention is illustrated by way of example, and not by way of limitation, in the figures of the accompanying drawings, in which like reference numerals refer to similar elements.

BRIEF DESCRIPTION OF DRAWINGS

FIG. 1 illustrates a transmitting device and receiving device according to the invention.

FIGS. 3.1 represents a RS pattern according to the invention in the case of a transmitting device implementing an OFDM scheme.

FIGS. 3.2 represents a RS pattern according to the invention in the case of a transmitting device implementing an OFDM scheme.

FIGS. 3.3 represents a RS pattern according to the invention in the case of a transmitting device implementing an OFDM scheme.

FIGS. 4.1 represents a RS pattern according to the invention in the case of a transmitting device implementing a SC-FDMA scheme.

FIGS. 4.2 represents a RS pattern according to the invention in the case of a transmitting device implementing a SC-FDMA scheme.

FIGS. 4.3 represents a RS pattern according to the invention in the case of a transmitting device implementing a SC-FDMA scheme.

DESCRIPTION OF EMBODIMENTS

Figure 2:
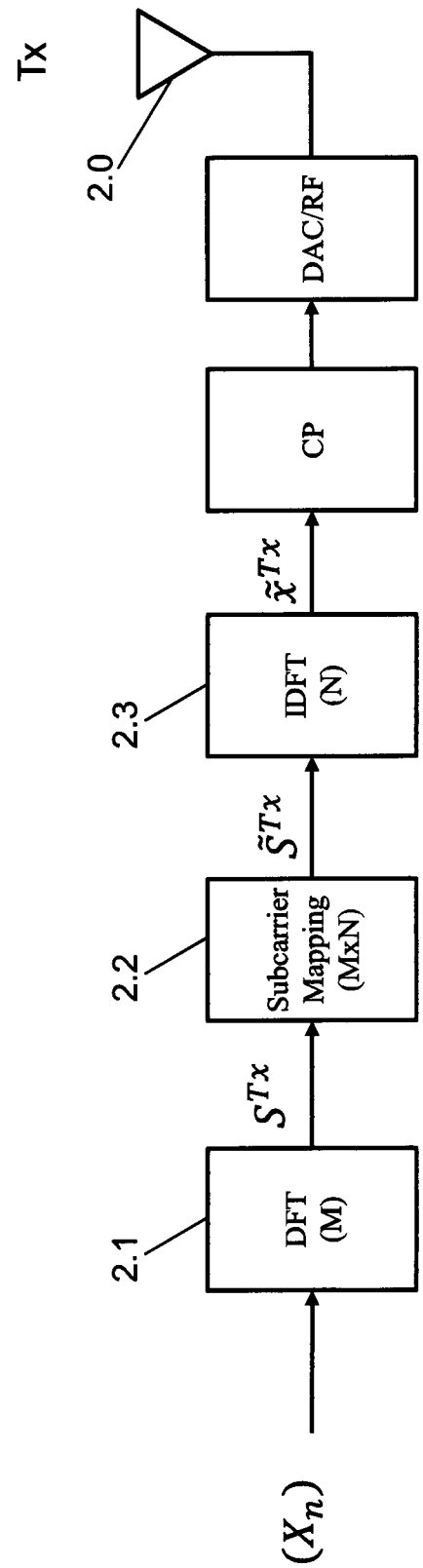
FIG. 2 schematizes a block diagram of a SC-FDMA transmitting device.

Referring to FIG. 1, it is shown a transmitting device 1.1 emitting a radio signal received by a receiving device 1.2. The receiving device 1.2 is in the coverage of the transmitting device 1.1. This transmission may be for example an OFDM based transmission or for example a SC-FDMA. The receiving device 1.2 and the transmitting device 1.1 are both mobile devices, that is, the devices are involved in a D2D communication, for example, a Vehicle-to-everything (V2X) communication in the context of the standards LTE or NR. More generally, the transmitting device 1.1 and the receiving device 1.2 may be any types of mobile device, for example, vehicular communication system, a personal communication equipment (for example a user equipment), etc.

The transmitting device 1.1 comprises one communication module (COM_trans) 1.3, one processing module (PROC_trans) 1.4 and a memory unit (MEMO_trans) 1.5. The MEMO_trans 1.5 comprises a non-volatile unit which retrieves the computer program and a volatile unit which retrieves the parameters of the transmission scheme (Modulation scheme applied, subcarrier spacing configurations, size of the slots etc.) and a set of RS patterns. The PROC_trans 1.4 is configured to process data to transmit to the receiving device 1.2 according to the transmission scheme (an example of transmission scheme is described in FIG. 2) and to insert RS such as the positions of these RS in the radio signal correspond to the positions defined in the RS pattern selected by the transmitting device 1.1. The COM_trans 1.3 is configured to emit the radio signal. The processing of the data intended to be transmitted may also be realized by the COM_trans 1.3 rather than by the PROC_trans 1.4, in that case the PROC_trans 1.4 configures the COM_trans 1.3 to perform this processing. Indeed, the processing may be performed by electronic circuits dedicated to the processing of the data according to the transmission scheme, or the processing may be performed by processors which process the data according to the transmission scheme. The invention is not limited to such implementations and encompasses any combination of electronic and computing processing to process the data according to the transmission scheme.

The receiving device 1.2 comprises one communication module (COM_recei) 1.6, one processing module (PROC_recei) 1.7 and a memory unit (MEMO_recei) 1.8. The MEMO_recei 1.8 comprises a non-volatile unit which retrieves a computer program and a volatile unit which retrieves the parameters of the receiving scheme and which stores the RS pattern used by the transmitting device 1.1 in the D2D communication. The PROC_recei 1.7 is configured to process the radio signal received from the transmitting device 1.1 according to the receiving scheme. The COM_recei 1.6 is configured to receive from the transmitting device 1.1 the radio signal. The processing of the radio signal to retrieve the data may also be carried out by the COM_recei 1.6 rather than by the PROC_recei 1.5, in that case the PROC_recei 1.5 configures the COM_recei 1.6 to perform this processing. Indeed, the processing may be performed by electronic circuits dedicated to the processing of the radio signal according to the receiving scheme, or the processing may be performed by processors which process the radio signal according to the receiving scheme. The invention is not limited to such implementations and encompasses any combination of electronic and computing processing to process the radio signal according to the receiving scheme.

In the example of FIG. 1 only two devices are represented. However, the invention is not limited to such one to one D2D communication and also encompasses cases where more than one device is intended to receive the radio signal. For example, several receiving devices may receive the radio signal transmitted by the transmitting device 1.1, for example, in a multicast type transmission or a broadcast type transmission.

Referring to FIG. 2, there is shown a block diagram of the transmitting device 1.1 implementing a single-carrier frequency division multiple access (SC-FDMA) scheme. Such transmitting device 1.1 may apply a SC-FDMA scheme on a block of M symbols to obtain the radio signal.

The block of symbols may be obtained by a modulation and coding scheme (MCS) module implementing for example a QAM digital modulation scheme or any other digital modulation scheme. M is the number of allocated subcarriers.

A M-size DFT 2.1 (discrete Fourier transform) is applied to the block of M symbols $(X_n)$, with n from 0 to M−1. At the output of the M-size DFT 2.1, M complex symbols $(S_k)_{k \in [[0; M-1]]}$ are obtained in the frequency domain. That is, one complex symbol is obtained for each k-th subcarrier among the M allocated subcarriers. These complex symbols are mapped with a subcarrier mapping module 2.2 in the frequency domain to M out of N inputs of a N-size IDFT module 2.3. Regarding the subcarrier mapping, the vector of complex symbols $S=(S_k)_{K \in [[0; M-1]]}$ is mapped to the M allocated subcarriers out of N existing subcarriers via a subcarrier mapping module 2.2. The subcarrier mapping can be for example localized, that is the M elements of the vector S are mapped to M consecutive subcarriers among the N existing. The subcarrier mapping can be for example distributed, that is the M elements of each vector S are mapped equally distanced over the entire bandwidth with zero occupying the unused subcarriers.

An inverse DFT of size N 2.3 is then applied to the resulting vector $\tilde{S}$ of the subcarrier mapping module 2.2, therefore generating a SC-FDMA symbol, being sent from the transmit antenna 2.0. More precisely, at the output of the IDFT module 2.3 a signal $\tilde{n}=(\tilde{x}_0, \ldots, \tilde{x}_{N-1})$ is obtained. This signal occupies M allocated subcarriers out of the N existing subcarriers. The signal $\tilde{x}$ is a time-domain signal which frequency-domain representation is the complex symbol $S_k$ for each $k^{th}$ occupied subcarrier with k=0 to M−1. Equivalently, the time-domain signal $\tilde{x}$ represents in the frequency domain the complex symbol $S_k$ for each $k^{th}$ frequency with k=0 to M−1. This time-domain signal $\tilde{x}$ represents a SC-FDMA symbol. A cyclic prefix can be optionally appended after IDFT.

The D2D communication may be a Multiple-Input Multiple-Output (MIMO) communication; in this case the transmitting device 1.1 implements a MIMO encoder. It is well known by the skilled person how to implement SC-FDMA schemes in the case of MIMO communications implementing T transmitting antennas T×k, with k from 1 to T. That is, a MIMO encoder may be set for example at the output of the M-size DFT 2.1, which for the $k^{th}$ antenna transforms the vector of complex symbols $S=(S_k)_{k \in [[0; M-1]]}$ inputted in the MIMO encoder into a vector of complex symbols $S'^{T \times k}=(S'^{T \times k}_k)_{k \in [[0; M-1]]}$ according to a precoding matrix. Then on each of the vector of complex symbols $S'^{T \times k}$ is applied a OFDM scheme, that is, a subcarrier mapping module 2.2 and a N-size IDFT module 2.3 as previously described. Therefore, the $k^{th}$ antenna emits a signal $\tilde{x}^{T \times k}$ representing a SC-FDMA symbol. All the signals $\tilde{x}^{T \times k}$ represent a symbol of the transmission scheme which form the radio signal emitted by the transmitting device 1.1.

The skilled person understands that the invention may be applied with other schemes implemented in the transmitting device 1.1, for example, with OFDM schemes. That is, by not applying a DFT 2.1 to the block of M symbols but directly mapping these symbols to the M allocated subcarriers out of N existing subcarriers via a subcarrier mapping module 2.2. In the case of a MIMO communication described above, implementing OFDM schemes is done by not applying a DFT 2.1 to the block of M symbols, but inputting these M symbols directly in the MIMO encoder which processes these symbols as described above.

In another variant, the invention may be applied to other types of precoded OFDM schemes, by applying other types of precoding instead of the DFT module 2.1. In yet another variant, the invention equally applies to non-multicarrier transmission schemes.

Referring to FIGS. 3.1 to 3.3 and 4.1 to 4.3, there is shown different possible DMRS insertion patterns for D2D communication in the NR standard according to transmitting schemes implementing different waveforms.

FIGS. 3.1 to 3.3 refer to insertion patterns used with transmission schemes implementing OFDM-based schemes.

In NR, the transmission is divided in slots whose size can vary from 2 to 14 symbols. The slots represented contain 9 symbols. Each square represents a resource element (RE), that is, the smallest time-frequency unit. A RE is carried on a unique subcarrier in the frequency domain and in a unique symbol in the time domain, that is, a RE represents a subcarrier of a symbol. 12 subcarriers represent a resource block RB, that is, the smallest resource allocation unit.

A RS occupies one RE. Therefore, in grey are represented the positions of the RS (for example DMRS) in the RS pattern. Each figure represents a RS pattern with a different number of symbols comprising RS. FIG. 3.1 represents a time density of 1/9, that is, one symbol comprising at least one RS out of the 9 symbols of the slot. FIG. 3.2 represents a time density of 2/9, that is, two symbols each comprising at least one RS out of the 9 symbols of the slot. FIG. 3.3 represents a time density of 3/9, that is, 3 symbols each comprising at least one RS out of the 9 symbols of the slot. FIGS. 3.1 and 3.3 have the same frequency density, which is 4 RS (or ⅓ out of 12 subcarriers in a RB). FIG. 3.2 has a frequency density of 6 RS (or ½ out of 12 subcarriers in a RB).

In the NR standard the RS patterns are completely defined on one slot. Therefore, when implementing a RS pattern, the RS are inserted in the same positions in every slot, until another RS pattern is implemented. The time density is therefore the number of symbols comprising RS out of the number of symbols in a time unit.

The transmitting device may inform the receiving devices of the RS pattern used in the D2D communication by transmitting a specific information in a field in a sidelink control channel.

The specific information may be a value from an index mapped to the set of RS patterns. Therefore, each value of the index refers to a specific RS pattern.

The specific information may comprise a value representing a time density (or a number of symbols comprising RS) in the RS patterns, for example, the value 1 for the RS pattern represented in FIG. 3.1, the value 2 for the RS pattern represented in FIG. 3.2 and the value 3 for the RS pattern represented in FIG. 3.3. If there is at the most one RS pattern in the set of RS patterns available for D2D communication for each time density the receiving devices 1.2 may retrieve the RS pattern used based on this value.

If for at least one of these numbers several RS patterns are available in the set of RS patterns, then the specific information may comprise a second value representative of the level of density of RS in the frequency domain. For example, the value 1 may represent a low frequency density as represented in FIGS. 3.1 and 3.3 and the value 2 may represent a high frequency density as represented in FIG. 3.2. Therefore, the specific information transmitted through the sidelink control channel is the pair (1; 1) for the RS pattern represented in FIG. 3.1, the pair (2; 2) for the RS pattern represented in FIG. 3.2 and the pair (3; 1) for the RS pattern represented in FIG. 3.3.

In another example, if for at least one of these numbers and/or for at least one of these pairs of numbers several RS patterns are available in the set of RS patterns (e.g. with different positions in the frequency domain, or with different values mapped to the same positions), then specific information necessary for uniquely identifying a RS pattern may depend on communication conditions as, for example, an identifier of the transmitter and/or an identifier of the receiver and/or an identifier of the group of receivers. In this case, the transmitter chooses the exact pattern based on communication conditions commonly known by the transmitter and the receiver and/or group of receivers and does not need to send any supplementary specific information.

FIGS. 4.1 to 4.3 refer to insertion patterns used with transmission schemes implementing SC-FDMA schemes.

When implementing such SC-FDMA schemes the RS may be inserted in the frequency domain, that is, after the M-size DFT 2.1 is applied and before the N-size IDFT module 2.3 is applied. Therefore, the RS are inserted in the same manner than with transmission schemes implementing OFDM schemes. Thus, the RS patterns may be represented by the same specific information.

In addition, when implementing SC-FDMA schemes it may be advantageous to insert the RS in the time domain, that is, before applying the M-size DFT 2.1. Such insertion enables to maintain the single carrier property of the SC-FDMA scheme. Therefore, among the M symbols inputted in the M-size DFT 2.1 some of them are set as RS. The RS pattern represented in FIG. 4.1 requires to insert 2 RS out of the M symbols inputted in the DFT 2.1 (M is equal to 12 on the FIGS. 4.1 to 4.3). The RS pattern represented in FIG. 4.2 requires to insert 4 RS out of the M symbols and the RS pattern represented in FIG. 4.3 requires to insert 6 RS out of the M symbols.

As in the case of FIGS. 3.1 to 3.3, the transmitting device may inform the receiving devices of the RS pattern used in the D2D communication by transmitting a specific information in a field in a sidelink control channel.

The specific information may be a value from an index mapped to the set of RS patterns. Therefore, each value of the index refers to a specific RS pattern.

The specific information may be a value representing the pre-DFT positions of the RS patterns, for example, the value 1 for the RS pattern represented in FIG. 4.1, the value 2 for the RS pattern represented in FIG. 4.2 and the value 3 for the RS pattern represented in FIG. 4.3.

As in the case of FIGS. 3.1 to 3.3, the transmitting device may choose the pre-DFT positions based on communication conditions as, for example, an identifier of the transmitter and/or an identifier of the receiver and/or an identifier of the group of receivers. In this case, the transmitter chooses the exact pattern based on communication conditions commonly known by the transmitter and the receiver and/or group of receivers and does not need to send any supplementary specific information.

The skilled person understands that the FIGS. 3.1 to 4.3 may be easily transposed to any other types of RS pattern and any frame structure.

Figure 5:
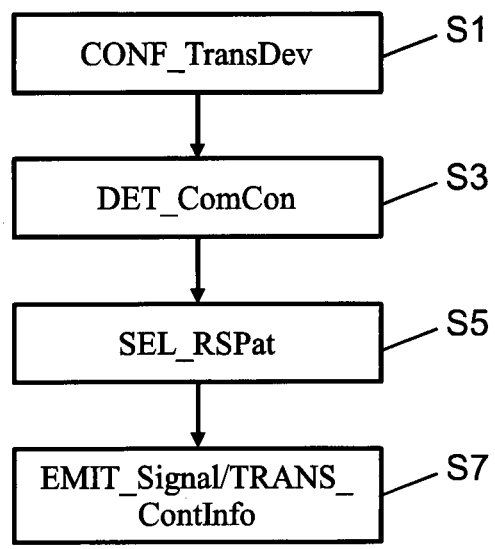
FIG. 5 illustrates a flowchart representing the steps for emitting a radio signal according to a selected RS pattern according to the invention.

Referring to FIG. 5 it is shown a flowchart representing the steps for emitting a radio signal according to a selected RS pattern.

At step S1 the transmitting device is configured. The configuration of the transmitting device 1.1 may be done by a base station and by the transmitting device 1.1 itself.

The configuration done by the base station, is done when the transmitting device 1.1 is in the coverage of this base station so that the transmitting device 1.1 is configured in accordance to the receiving devices 1.2 with which it will be involved in a D2D communication.

The configuration done by the transmitting device 1.1 itself relates to configuring the communication, that is to set the communication parameters used by the transmitting device 1.1 in the D2D communication (for example, transmission scheme, subcarrier spacing, etc.).

When the transmitting device 1.1 is in the coverage of a base station, the base station may transmit information to the transmitting device 1.1 to configure it.

For example, the base station may transmit a set of values to which a set of thresholds $Th_0, \ldots, Th_n$ is set. Each interval $[Th_i; Th_{i+1}$ [or] $Th_i; Th_{i+1}]$ corresponds to a i-th subset of RS patterns. When the set of values transmitted by the base station involves $Th_i=Th_{i+1}$ it disables the i-th subset of RS patterns. The values taken by the bound of each interval determines the relevancy of the corresponding subset of RS patterns according to the communication conditions. The set of thresholds as previously configured may be set as a default configuration. Therefore, the receiving devices 1.2 involved in the D2D communication are aware that the transmitting device 1.1 will use the configuration in the D2D communication. The subsets of RS patterns may be configured once for all or by a base station with the thresholds.

In another example, the base station may transmit information related to resource pools and/or bandwidth parts. This information enables the transmitting device 1.1 to determine the different resource pools and/or bandwidth parts that the transmitting device 1.1 can use for D2D communications.

These configurations of the transmitting device 1.1 may depend on the geographical area where the device is located. Therefore, all the devices in a given geographical area are aware of the default set of thresholds. In addition, the frequency bands allocated for wireless communications may differ from a geographical area to another.

At step S3 the communication conditions are determined (put another way, evaluated). The communication conditions may be determined by the device 1.1 or may be transmitted by the other devices 1.2, for example via a sidelink control channel. That is either the transmitting device 1.1 determines a level of a communication condition or this level is transmitted to the transmitting device 1.1.

The communication conditions are related to the radio channels between the transmitting device 1.1 and the receiving devices 1.2 and/or to the parameters of the D2D communication.

1. Number of Symbols

One of the communication condition may be the number of symbols in the time unit of a partition scheme. In the context of a NR D2D communication, this communication condition refers to the number of symbols in the slot that will be used for the transmission to the receiving devices 1.2. The number of symbols in a slot may range from 2 to 14 symbols. Therefore, the transmitting device 1.1 may assign a level from 1 to 13 respectively to the sizes of the slots. In a variant, the transmitting device 1.1 may assign levels to groups of sizes of the slots, for example, the level 1 for the small sizes of slots (for example, the slots from 2 to 4), the level 2 for the medium sizes of slots (for example, the slots from 5 to 10) and the level 3 for the large sizes of slots (for example, the slots from 11 to 14). This reduces the complexity of the computing to select the RS pattern.

2. Time Domain Duration of a Symbol

One of the communication condition may be the time domain duration of a symbol used for the D2D communication. In the NR standard, symbols with different time duration may be used, especially when using multi-carrier implementing several subcarrier spacing configurations. The transmitting device 1.1 may assign levels to each subcarrier spacing configuration or for groups of subcarrier spacing configurations. For example, the level 1 for short duration symbols (with wide subcarrier spacing configuration), the level 2 for medium duration symbols (with medium subcarrier spacing configuration) and the level 3 for long duration symbols (with small subcarrier spacing configuration).

3. Resource Pool and/or a Bandwidth

One of the communication condition may be the resource pools and/or the bandwidth parts which are used in the D2D communication. Indeed, in NR several resource pools and/or bandwidth parts may be configured in a carrier. Each resource pool and/or bandwidth may be used for specific services. These services may bear different levels of decoding error. For example, an emergency service (with safety-related information) may require a better level of decoding (and thus a RS pattern with more RS). In addition, the resource pools and/or the bandwidth parts may have different interference profile, for example, depending on if the network uses or not radio resources in same or adjacent bands. Therefore, the transmitting device 1.1 may assign levels according to the resource pools and/or the bandwidth parts used for the D2D communication.

In addition, the network may prohibit some of the RS patterns.

4. Relative Speed

One of the communication condition may be the relative speed between the transmitting device 1.1 and the receiving devices 1.2 involved in a D2D communication.

The transmitting device 1.1 may determine the relative speed experimented with one receiving device 1.2 by measuring:

the strength of the signal received from the receiving device 1.2;
the strength variations of the signal received from the receiving device 1.2;
the Doppler shift of the signal received from the receiving device 1.2; and/or
the Doppler spread of the signal received from the receiving device 1.2.

The relative speed may also be measured by these methods by the receiving device 1.2 which transmits an indication on the relative speed to the transmitting device 1.1.

The relative speed may also be obtained by other measurement systems collocated with the transmitting device 1.1 or receiving device 1.2.

When the D2D communication involves more than one receiving device 1.2, the transmitting device 1.1 may obtain the relative speed of each or at least a subset of the receiving devices 1.2 (as previously described) based on which a relative speed of the group of receiving devices 1.2 is obtained.

The relative speed of the group may be obtained by computing:

an average of the relative speeds obtained; or
an average of the relative speeds obtained, each obtained relative speed being weighted according to the signal strength.

According to the relative speed or the relative speed of the group the transmitting device 1.1 may assign levels. For example, the level 1 for low or pedestrian speed, the level 2 for medium or vehicular speed and the level 3 for high speed.

5. Routing Scheme

One of the communication condition may be the routing scheme used in the D2D communication.

When the routing scheme is unicast and multicast the transmitting device 1.1 may obtain feedbacks by the receiving devices 1.2 on the radio channel or analyze previously received radio signals sent from the receiving devices 1.2. Therefore, the transmitting device 1.1 may assign levels for example according to the quality of the radio channel. For example, the level 1 for high quality radio channel, the level 2 for medium quality radio channel and the level 3 for poor quality radio channel. When the D2D communication involves several receiving devices 1.2 an average level may be taken for the group of receiving devices 1.2.

In the case of broadcast, the transmitting device 1.1 may automatically assign the level 3.

6. Modulation and Coding Scheme (MCS)

One of the communication condition may be the modulation and coding scheme used in the D2D communication.

In NR as in LTE, several coding schemes and several modulation schemes, that is, several modulation and coding schemes are available. The modulation and coding scheme impacts directly the data rate and the robustness of the signal. Therefore, the transmitting device 1.1 may assign levels according to the order of the MCS. For example, the level 1 for low order MCS, the level 2 for medium order MCS and the level 3 high order MCS.

7. Transmission Scheme and Waveform

One of the communication condition may be the transmission scheme and/or the waveform used in the D2D communication.

In NR several transmission schemes are defined or may be introduced in future releases, such as codebook-based, non-codebook based, single antenna port transmission, precoder vector cycling in the time or frequency domain, transparent (e.g. cyclic delay diversity) or non-transparent transmit diversity (e.g. Alamouti-based).

These transmission schemes implement different waveform, for example, a SC-FDMA or an OFDM type of transmission scheme. The transmitting device 1.1 may be restrained to specific RS patterns, for example, RS patterns designed for pre-DFT insertion of the RS when a SC-FDMA type of transmission scheme is used.

8. Resource Allocation

One of the communication condition may be the resource allocated for the D2D communication.

The transmitting device 1.1 may assign levels according to the size and shape of the resource allocation.

In the previous examples of levels assigned according to each specific communication condition, the levels do not make the difference between the number of symbols containing RS and the number of subcarriers carrying RS. However, the levels may be replaced by pairs of levels, one level impacting the time density of RS pattern to be selected and another impacting the frequency density of the RS pattern to be selected.

The levels may be assigned differently for each communication condition.

When all the communication conditions are determined, the transmitting device 1.1 may select the RS pattern at step S5 based on these communication conditions. The selection of the RS pattern may also be done when sufficient communication conditions have been determined, that is, all the communication conditions are not determined but only a group of them, for example, based on the communication conditions that could have been determined during a predefined duration.

At step S5, based on the communication conditions the transmitting device 1.1 selects a RS pattern.

For each communication condition or at least for some of the communication conditions either levels have been assigned and/or RS patterns have been prohibited and/or the selection is restrained to a subset of RS patterns. Before selecting a RS pattern from the set of RS pattern, the transmitting device 1.1 may remove the prohibited RS patterns from the restrained subset of RS patterns and then select among the resulting set of RS patterns a RS pattern.

To select among the resulting set of RS patterns the transmitting device 1.1 obtains a value V corresponding to the communication conditions. This value may be obtained by summing the levels obtained for the communication conditions. The sum may be a weighted sum of levels, indeed, some of the communication conditions may be more relevant and have a more direct impact on the selection of the RS pattern. Once the value V is obtained, the subset of RS patterns corresponding to the i-th interval ([$Th_i$; $Th_{i+1}$ [or]$Th_i$; $Th_{1+1}$]) containing the value V is intersect with the resulting set of RS patterns. The transmitting device 1.1 then selects a RS pattern from the RS patterns resulting from this intersection.

At step S7 the transmitting device 1.1 transmits information relative to the selected RS pattern. This information may be any information which enables the receiving devices 1.2 to determine the RS pattern. For example, the specific information is the value described according to FIGS. 3.1 to 4.3 and transmitted in a field in a sidelink control channel.

In another example, this information is implicit information, for example, the receiving devices 1.2 are able to determine the RS pattern to be used based on a common set of rules known by both the receiving devices 1.2 and the transmitting device 1.1 and/or based on information related to other purposes. For example, information related to other purposes may be an indication on slot configuration, and/or an indication of the configuration of other types of RS, and/or an indication relative to a parameter of communication, or any other information not explicitly indicating a specific RS pattern.

If the transmitting device 1.1 used different thresholds than in the default configuration, information relative on these different thresholds is transferred to the receiving devices 1.2.

The transmitting device 1.1 emits the radio signal for D2D communication according to the determined RS pattern, that is, emitting the radio signal comprising RS in positions defined in the selected RS pattern.

The invention claimed is:

1. A method implemented by a user equipment to transmit reference signal, RS, in a device-to-device, D2D, communication in a wireless communication system, the method comprising:
   selecting, by the user equipment, an RS pattern among a set of at least two RS patterns, stored in the user equipment, according to at least conditions related to a radio channel of the D2D communication and/or to a communication parameter of the D2D communication;
   emitting a radio signal for D2D communication according to the selected RS pattern;
   wherein the selection of the RS pattern by the user equipment comprises:
   obtaining a value corresponding to the conditions related to a radio channel of the D2D communication or to the communication parameter of the D2D communication;
   receiving a set of thresholds $Th_0, \ldots, Th_n$, where, $Th_i \leq Th_{i+1}$, $0 \leq i \leq n-1$ and either a set of each half-open interval [$Th_i$; $Th_{i+1}$) or a set of each half-open interval ($Th_i$; $Th_{i+1}$] corresponds to a subset of the set of at least two RS patterns;
   comparing the value with the set of thresholds $Th_0, \ldots, Th_n$, and disabling an i-th subset of the at least two RS patterns where $Th_i = Th_{i+1}$; and
   selecting an RS pattern among the subset corresponding to the half-open interval in which the value is based on the comparing.

2. The method according to claim 1 further comprises determining the conditions or the communication parameter by the user equipment.

3. The method according to claim 1 further comprises transmitting information relative to the selected RS pattern.

4. The method according to claim 1, wherein at least one RS pattern among the set of RS patterns corresponds to a pattern where a number X of symbols comprise RS and one RS pattern among the set of RS patterns corresponds to a pattern where a number Y of symbols comprise RS, said number Y being different than the number X, the symbols of each pattern being symbols outputted by the transmission scheme used by the user equipment to transmit the radio signal.

5. The method according to claim 1, wherein the selection of the RS pattern is made according to at least the communication parameter, said communication parameter being a number of symbols in a time unit of a partition scheme, said partition scheme dividing the radio signal into groups of symbols.

6. The method according to claim 1, wherein the selection of the RS pattern is made according to at least the communication parameter, said communication parameter being a time domain duration of a symbol used for the D2D communication.

7. The method according to claim 1, wherein the selection of the RS pattern is made according to at least the communication parameter, said communication parameter being a subcarrier spacing configuration used for the D2D communication.

8. The method according to claim 1, wherein the selection of the RS pattern is made according to at least the communication parameter, said communication parameter being a set of resources comprising the resource used by the user equipment for transmitting of the radio signal.

9. The method according to claim 1, wherein the selection of the RS pattern is made according to at least one of the conditions related to the radio channel of the D2D communication, said at least one of the conditions related to the radio channel of the D2D communication being a relative speed between the user equipment and a receiving user equipment or the user equipment and a group of receiving user equipment.

10. The method according to claim 1, wherein the selection of the RS pattern is made according to at least the communication parameter, said communication parameter being a type of routing scheme.

11. The method according to claim 10, wherein if the type of routing scheme is broadcast an RS pattern with a greatest number of symbols including RS among the RS patterns of the set of RS patterns is selected.

12. The method according to claim 1, wherein the selection of the RS pattern is made according to at least the communication parameter, said communication parameter being a type of modulation and coding scheme.

13. The method according to claim 1, wherein the selection of the RS pattern is made according to at least the communication parameter, said communication parameter being a type of transmission scheme.

14. The method according to claim 1, wherein the selection of the RS pattern is made according to at least the communication parameter, said communication parameter being a type of waveform.

15. The method according to claim 1, wherein the selection of the RS pattern is made according to at least the communication parameter, said communication parameter being a resource allocation.

16. A non-transitory computer readable medium including instructions stored thereon which when executed by a processor cause the processor to perform the method according to claim 1.

17. A user equipment for transmitting reference signals, RS, in a device-to-device, D2D, communication in a wireless communication system, the user equipment comprises:
a processor; and
a non-transitory computer-readable medium comprising instructions stored thereon, which when executed by the processor configure the user equipment to:
select an RS pattern among a set of at least two RS patterns, stored in the user equipment, according to at least conditions related to a radio channel of the D2D communication and/or to a communication parameter of the D2D communication;
transmitting a radio signal for D2D communication according to the determined RS pattern,
wherein the selection of the RS pattern by the user equipment comprises:
obtaining a value corresponding to the conditions related to a radio channel of the D2D communication or to the communication parameter of the D2D communication;
receiving a set of thresholds $Th_0, \ldots, Th_n$, where, $Th_i \leq Th_{i+1}$, $0 \leq i \leq n-1$ and either a set of each half-open interval $[Th_i; Th_{i+1})$ or a set of each half-open interval $(Th_i; Th_{i+1}]$ corresponds to a subset of the set of at least two RS patterns;
comparing the value with the set of thresholds $Th_0, \ldots, Th_n$, and disabling an i-th subset of the at least two RS patterns when $Th_i = Th_{i+1}$; and
selecting an RS pattern among the subset corresponding to the half-open interval in which the value is based on the comparing.

* * * * *